(12) United States Patent
Yamada et al.

(10) Patent No.: US 8,002,064 B2
(45) Date of Patent: Aug. 23, 2011

(54) FRAME STRUCTURE OF AUTOMOTIVE VEHICLE

(75) Inventors: Hideto Yamada, Hiroshima (JP); Eiji Okada, Hiroshima (JP)

(73) Assignees: Ford Global Technologies LLC, Dearborn, MI (US); Mazda Motor Corporation, Hiroshima (JP)

( * ) Notice: Subject to any disclaimer, the term of this patent is extended or adjusted under 35 U.S.C. 154(b) by 132 days.

(21) Appl. No.: 12/473,898

(22) Filed: May 28, 2009

(65) Prior Publication Data

US 2010/0045072 A1 Feb. 25, 2010

(30) Foreign Application Priority Data

Aug. 21, 2008 (JP) ................................ 2008-213099

(51) Int. Cl.
*B62D 24/00* (2006.01)
*B62D 33/06* (2006.01)
*B62D 21/02* (2006.01)
*B62D 21/09* (2006.01)

(52) U.S. Cl. ...................... 180/89.12; 180/311; 280/781; 280/797; 296/35.1

(58) Field of Classification Search ............... 180/89.12, 180/232, 311; 280/781, 784, 796, 797, 798, 280/800; 296/35.1, 187.08, 187.09, 190.01, 296/193.05, 193.07, 193.09, 204; *B62D 21/02, B62D 21/09, 21/15*
See application file for complete search history.

(56) References Cited

U.S. PATENT DOCUMENTS

| | | | | |
|---|---|---|---|---|
| 1,514,981 A * | 11/1924 | Merville | | 296/35.1 |
| 1,552,702 A * | 9/1925 | Irish | | 296/35.1 |
| 1,652,357 A * | 12/1927 | Harper | | 296/35.1 |
| 1,737,177 A * | 11/1929 | Schantz | | 296/35.1 |
| 1,982,105 A * | 11/1934 | Hughes | | 296/209 |
| 2,136,122 A * | 11/1938 | Einar | | 280/797 |
| 2,384,096 A * | 9/1945 | Kishline | | 296/35.1 |
| 2,403,145 A | 7/1946 | Ulrich | | |
| 2,549,102 A * | 4/1951 | Kramer | | 296/35.1 |
| 2,769,656 A * | 11/1956 | Lee | | 296/35.1 |
| 3,101,809 A * | 8/1963 | Hostetler et al. | | 180/89.15 |
| 3,177,031 A * | 4/1965 | Schilberg | | 296/204 |
| 3,554,596 A * | 1/1971 | Le Fevre | | 296/190.05 |
| 4,203,499 A * | 5/1980 | Miyata | | 180/89.12 |
| 5,308,115 A * | 5/1994 | Ruehl et al. | | 280/785 |
| 5,385,369 A | 1/1995 | Mukai et al. | | |

(Continued)

FOREIGN PATENT DOCUMENTS

JP 06127429 5/1994

(Continued)

*Primary Examiner* — Paul N Dickson
*Assistant Examiner* — Laura Freedman
(74) *Attorney, Agent, or Firm* — Fredrick Owens Bejin, PLC

(57) ABSTRACT

A pair of side frames extends longitudinally away from each other in a vehicle width direction, which includes a closed cross section formed by an outer panel having a U-shaped cross section with its vehicle's inward side opening and an inner panel having a U-shaped cross section with its vehicle's outward side opening. A cab-mount bracket is provided on a vehicle-outward side of a front portion of the side frame to support a cabin. The cab-mount bracket includes an upper portion which is joined to a side face of a side portion of the outer panel and extends in an outward direction, and a lower portion which includes an extension portion extending in a vehicle inward direction beyond the side face of the outer panel and be joined to a lower face of a bottom portion of the inner panel.

15 Claims, 13 Drawing Sheets

U.S. PATENT DOCUMENTS

| | | | |
|---|---|---|---|
| 5,409,283 A * | 4/1995 | Ban | 296/35.1 |
| 5,561,902 A | 10/1996 | Jacobs et al. | |
| 5,685,599 A | 11/1997 | Kitagawa | |
| 5,897,139 A | 4/1999 | Aloe et al. | |
| 5,915,727 A | 6/1999 | Bonnville | |
| 6,398,262 B1 | 6/2002 | Ziech et al. | |
| 6,428,046 B1 | 8/2002 | Kocer et al. | |
| 6,439,608 B1 * | 8/2002 | Bonnville | 280/796 |
| 6,733,021 B1 | 5/2004 | Ziech et al. | |
| 6,733,040 B1 * | 5/2004 | Simboli | 280/800 |
| 6,866,295 B2 | 3/2005 | Ziech et al. | |
| 6,874,816 B2 | 4/2005 | Herrmann et al. | |
| 7,207,600 B2 | 4/2007 | Beckmann et al. | |
| 7,461,890 B2 | 12/2008 | Yatsuda | |
| 7,559,402 B2 | 7/2009 | Jennings et al. | |
| 7,703,805 B2 | 4/2010 | Sasaki et al. | |
| 7,762,619 B2 | 7/2010 | Baccouche et al. | |
| 7,802,816 B2 | 9/2010 | McGuire | |
| 7,862,085 B2 | 1/2011 | Xu et al. | |
| 7,959,170 B2 | 6/2011 | Mauz | |
| 2010/0045072 A1 | 2/2010 | Yamada et al. | |
| 2010/0194145 A1 * | 8/2010 | Akaki et al. | 296/187.08 |

FOREIGN PATENT DOCUMENTS

| | | | |
|---|---|---|---|
| JP | 06329049 A * | 11/1994 | |
| JP | 2000272537 A * | 10/2000 | |
| JP | 2002-205662 | 7/2002 | |

* cited by examiner

PRIOR ART

FRAME STRUCTURE OF AUTOMOTIVE VEHICLE

BACKGROUND OF THE INVENTION

The present invention relates to a frame structure of an automotive vehicle, and in particular, relates to a frame structure of an automotive vehicle equipped with a so-called radar frame, in which a cabin is supported by a cab-mount bracket which is provided on a vehicle outward side of a front portion of a pair of side frames which extends in a vehicle longitudinal direction.

Conventionally, the frame structure of an automotive vehicle equipped with the radar frame, such as a cab track, which comprises the cab-mount bracket to support the cabin which is provided on the vehicle outward side of the side frame, is known. Specifically, the cab-mount bracket is attached to a side face (outer side face) of the vehicle outward side of the side frame which has a substantially quadrilateral cross section. The cabin is mounted on an upper portion of the cab-mount bracket. Japanese Patent Laid-Open Publication No. 2002-205662 discloses such a frame structure of an automotive vehicle.

However, a conventional frame structure of an automotive vehicle has a problem in that the cross section of the side frame changes greatly at a vehicle frontal collision. Specifically, when an impact force acts on the side frame at the vehicle frontal collision, a shear force occurs at the cross section of the side frame in an elevation view, so that the cross section of the side frame may have a shear deformation. Particularly, in case the side frame is formed by a couple panels which are joined together, the shear force may concentrate at a joining portion of the panels.

SUMMARY OF THE INVENTION

The present invention has been devised in view of the above-described problem, and an object of the present invention is to provide a frame structure of an automotive vehicle which can restrain the shear deformation of the cross section of the side frame in the elevation view at the vehicle frontal collision.

According to the present invention, there is provided a frame structure of an automotive vehicle, comprising a pair of side frames extending in a vehicle longitudinal direction and provided being away from each other in a vehicle width direction, the side frame including a closed cross section which is formed by an outer panel and an inner panel which are joined together, the outer panel having a U-shaped cross section with a vehicle's inward side thereof opening and the inner panel having a U-shaped cross section with a vehicle's outward side thereof opening, and a cab-mount bracket provided on a vehicle outward side of a front portion of the side frame, the cab-mount bracket supporting a cabin, wherein the cab-mount bracket includes an upper portion which is joined to an outer side face of the outer panel of the side frame and extends in a vehicle outward direction and a lower portion which includes an extension portion thereof which extends in a vehicle inward direction beyond the outer side face of the outer panel of the side frame to a location of a lower face of the inner panel of the side frame, the extension portion of the lower portion of the cab-mount bracket being joined to the lower face of the inner panel of the side frame.

According to the present invention, the lower face of the inner panel can be supported by the extension portion of the cab-mount bracket, so that deformation of the cross section formed by the outer and inner panels which are joined together can be restrained.

According to an embodiment of the present invention, the side frame includes a bend portion which bends laterally or vertically at a specified portion thereof where the cab-mount bracket is provided or adjacent to the specified portion. Further, the upper portion of the cab-mount bracket comprises an upper-side member which is joined to the outer side face of the outer panel of the side frame and the lower portion of the cab-mount bracket comprises a lower-side member which has the extension portion at a vehicle inward portion thereof, the upper-side member and the lower-side member being joined together, and the extension portion of the lower-side member is joined to lower faces of the outer and inner panels of the side frame respectively. Thereby, the cab-mount bracket is formed by the two members of the upper-side member and the lower-side member, so that setting of the cab-mount bracket at the bend portion of the side frame can be facilitated.

According to another embodiment of the present invention, the extension portion of the lower-side member of the cab-mount bracket includes a pair of projection portions which is provided at a vehicle-forward end portion and a vehicle-rearward end portion of the extension portion so as to project downward and extend in the vehicle width direction, respectively. Thereby, the rigidity of the extension portion in the vehicle width direction can be increased.

According to another embodiment of the present invention, a vehicle-outward end portion of the lower-side member has a substantially U-shaped cross section with an upper side thereof opening and the upper-side member has a substantially U-shaped cross section with a lower side thereof opening, the lower-side member and the upper-side member are overlapped so as to form a crossed cross section therewith, and the upper-side member extends in the vehicle width direction over an area from the vehicle-outward end portion of the lower-side member to the extension portion of the lower-side member. Thereby, the closed cross section is formed by the vehicle-outward portion of the lower-side member and the upper-side member, so that the proper rigidity of the cab-mount bracket in the vehicle longitudinal direction can be ensured.

According to another embodiment of the present invention, the cab-mount bracket is configured such that a width of the extension portion in the vehicle longitudinal direction becomes narrower toward a vehicle inward side, and a cross member is provided so as to connect the pair of side frames in the vehicle width direction in such a manner an end portion thereof is joined to the lower face of the inner panel astride an vehicle-inward end portion of the extension portion of the cab-mount bracket. Thereby, the attachment area for the cross member can be ensured with the narrower width of the extension portion. Further, the cross member can be fixed firmly to the lower face of the inner panel, so that the rigidity of the frame structure can be further increased with the cross member.

According to another embodiment of the present invention, a vehicle-outward end portion of the lower-side member of the cab-mount bracket is located inwardly from a vehicle-outward end portion of the upper-side member, and the vehicle-outward end portion of the lower-side member has a substantially U-shaped inward curve contour. Thereby, the force transmitted to the vehicle-outward end portion from the upper-side member can be dispersed, and the width of the lower-side member can be made properly short.

According to another embodiment of the present invention, the bend portion of the side frame bends downward and reward near a vehicle front wheel, and the cab-mount bracket is provided at the bend portion of the side frame. Thereby, the lower face of the inner panel at the bend portion is supported, so that it can be properly restrained that the lower face of the bend portion deforms by using the cab-mount bracket.

According to another embodiment of the present invention, a reinforcement member is provided inside the bend portion of the side frame so as to extend in a longitudinal direction of the side frame and to be joined to an inner side face of the inner panel, without being joined to the outer panel. Thereby, joining of the inner panel and the outer panel can be facilitated, and the side portion of the inner panel at the bend portion can be reinforced with the reinforcement member, thereby properly restraining the shear deformation and bending deformation of the bend portion.

According to another embodiment of the present invention, the above-described reinforcement member is joined to the inner side face of the inner panel so as to cover a substantially whole area of the inner side face of the inner panel from a bottom portion to an upper portion of the inner panel. Thereby, the rigidity of the side portion of the inner panel can be increased by the reinforcement member, thereby further restraining the shear deformation of the section.

Other features, aspects, and advantages of the present invention will become apparent from the following description which refers to the accompanying drawings.

DETAILED DESCRIPTION OF THE INVENTION

Figure 1:
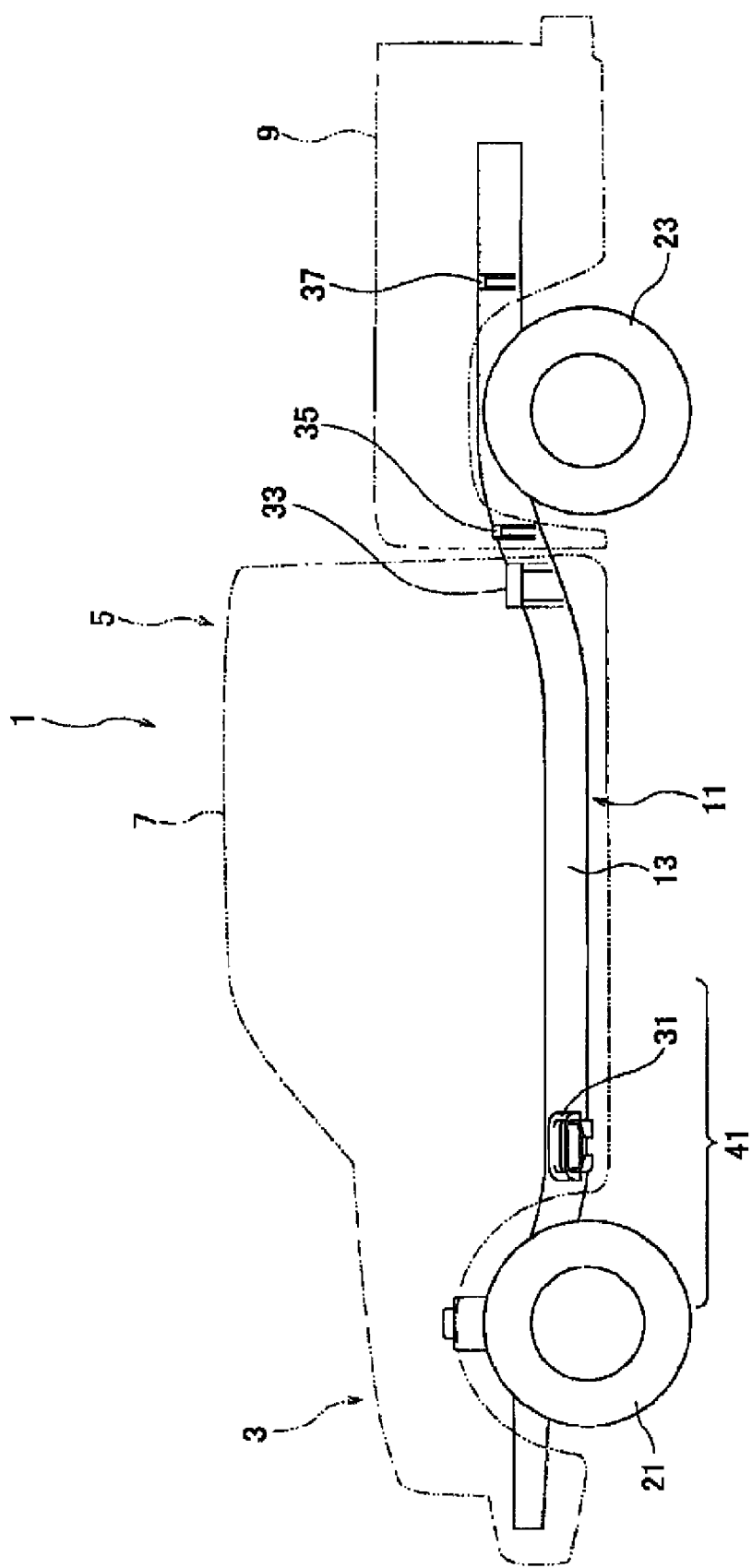
FIG. 1 is a side view showing a frame structure of an automotive vehicle according to a first embodiment of the present invention.

Hereinafter, a frame structure of an automotive vehicle according to preferred embodiments of the present invention will be described referring to the drawings.

Embodiment 1

Figure 2:
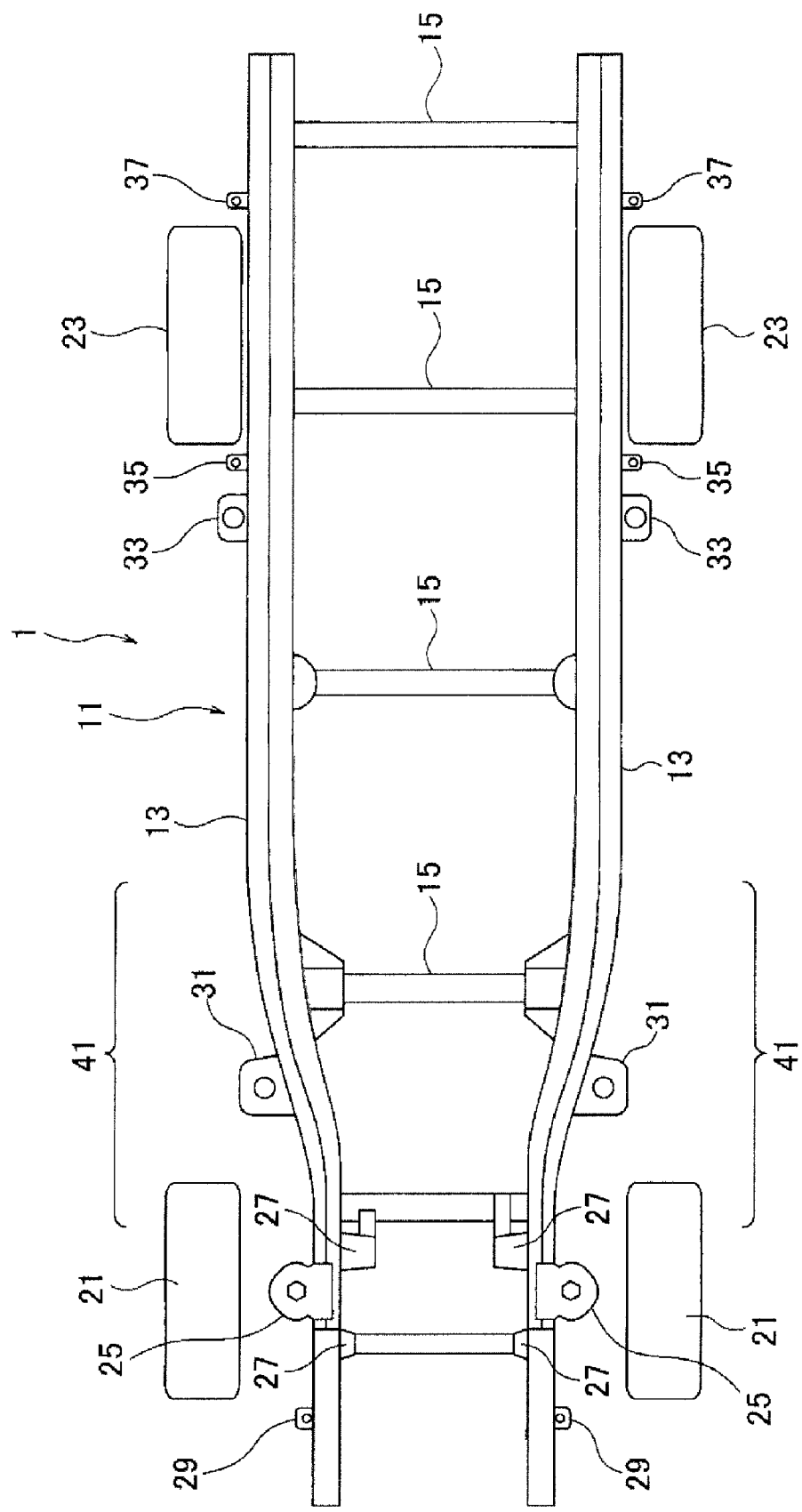
FIG. 2 is a plan view showing the frame structure of an automotive vehicle according to the first embodiment of the present invention.
Figure 3:
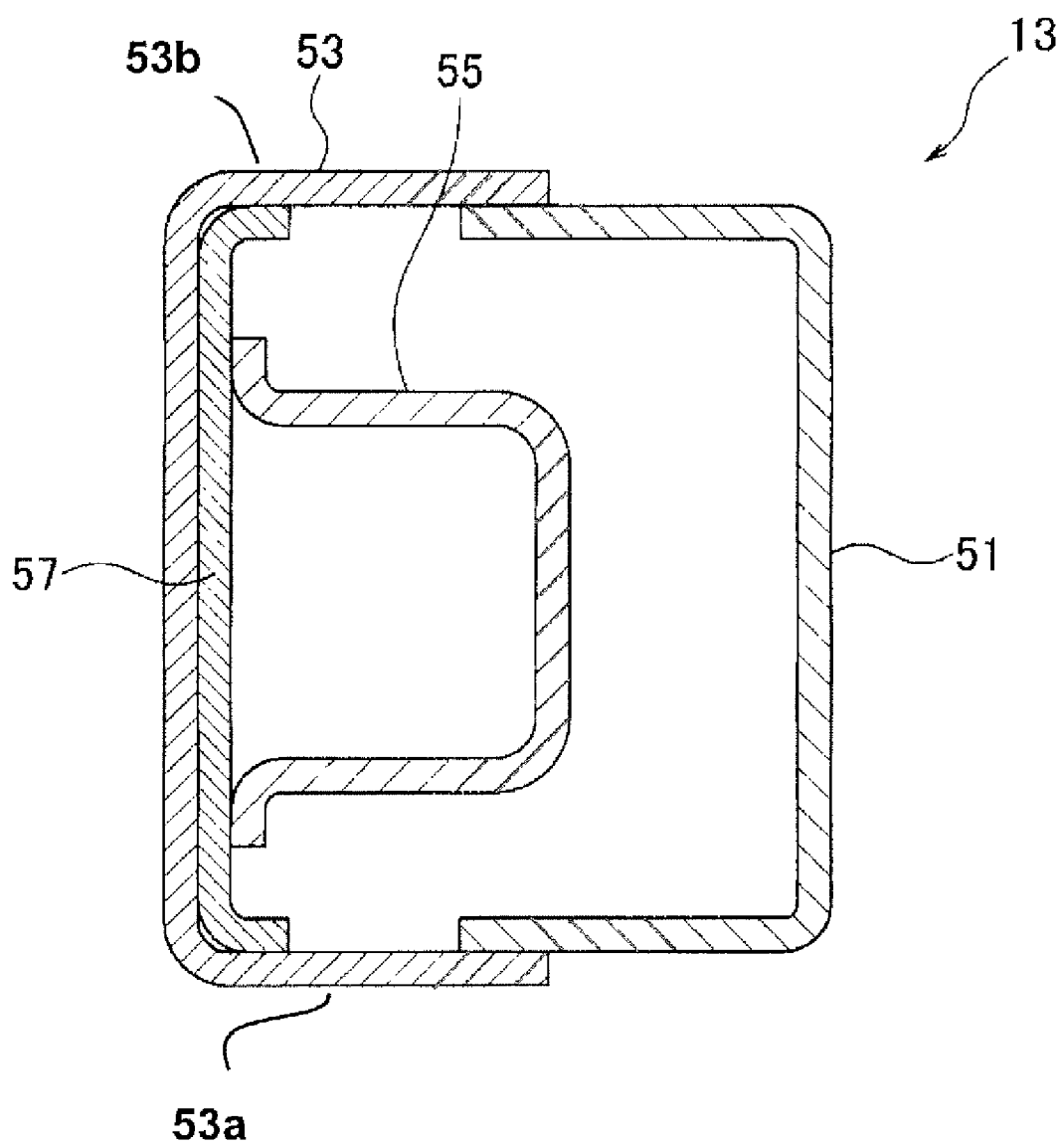
FIG. 3 is a sectional view showing a cross section of a side frame in an elevation view according to the first embodiment of the present invention.

FIG. 1 is a side view showing a frame structure of an automotive vehicle according to a first embodiment of the present invention. FIG. 2 is a plan view showing the frame structure of an automotive vehicle according to the present embodiment. FIG. 3 is a sectional view showing a cross section of a side frame in a vehicle width direction in an elevation view according to the present embodiment. While the present embodiment describes a cab track as an example of an automotive vehicle, the frame structure of an automotive vehicle according to the present invention can be applied to any other types of vehicles.

At first, as shown in FIGS. 1 and 2, a cab track 1 comprises an engine room 3, a cabin 7 which includes a vehicle compartment 5, and a bed 9 which is provided behind the cabin 7. The cabin 7 and the bed 9 are supported at a radar frame 11. The radar frame 11 is comprised of two side frames 13 which are provided away from each other and a plurality of cross members 15 which are connected to each other.

Each side frame 13 extends in a vehicle longitudinal direction from a portion in front of a front wheel 21 to a portion in back of a rear wheel 23. Along an axial line of the side frame 13 are provided a suspension tower 25, brackets for attaching a suspension arm 27 which are disposed before and behind the suspension tower 25, cab-mount brackets 29, 31, 33 which support (mount) the cabin 7, and bed mount brackets 35, 37 which support the bed 9. The side frame 13 has a bend portion 41 which bends in a specified direction at a portion thereof which is located near the front wheel 21. The bend portion 41 is formed in such a manner that it is inclined to the axial line of the side frame 13. Specifically, the side frame 13 bends outward in a vehicle width direction and downward at the bend portion 41. Thereby, the distance between the both side frames 13, 13 changes in such a manner that the distance at a specified portion below the vehicle compartment 5 is wider than that at a specified portion at the front wheel 21. Meanwhile, the height of the side frame 13 changes in such a manner that the height at the specified portion below the vehicle compartment 5 is lower than that at the specified portion at the front wheel 21. Accordingly, the cabin 7 can be supported stably at the side frames 13, and the proper height of the vehicle compartment can be ensured.

Next, as shown in HG 3, the side frame 13 comprises an outer panel 51 which has a U-shaped cross section with its vehicle's inward side opening and an inner panel 53 which has a U-shaped cross section with its vehicle's outward side opening. The side frame 13 includes a closed cross section which is formed by the outer panel 51 and the inner panel 53 which are joined together. Further, reinforcements 55, 57 are fixed to an inner side face of the inner panel 53 which extend in the vehicle longitudinal direction. Especially, the reinforcement 57 is joined to the inner side face of the inner panel 53 so as to cover a substantially whole area of the inner side face of the inner panel 53 from its bottom portion 53a to its upper portion 53b. Accordingly, the bend rigidity of the side frame 13 in the vehicle width direction can be increased.

To front and central portions of the side frame 13 are attached plural pairs of cab-mount brackets 29, 31, 33 to support the cabin 7 at the side frame 13 (see FIG. 2). These cab-mount brackets 29, 31, 33 are provided at a vehicle front portion in front of the front wheel 21, the bend portion 41, and a vehicle rear portion in back of the vehicle compartment 5, respectively. According to the frame structure of an automotive vehicle of the present embodiment, the shear deformation of the side frame 13 is prevented by the cab-mount bracket 31 which is provided at the bend portion 41. Hereinafter, the structure of the cab-mount bracket 31 at the bend portion 41 will be described specifically.

Figure 4:
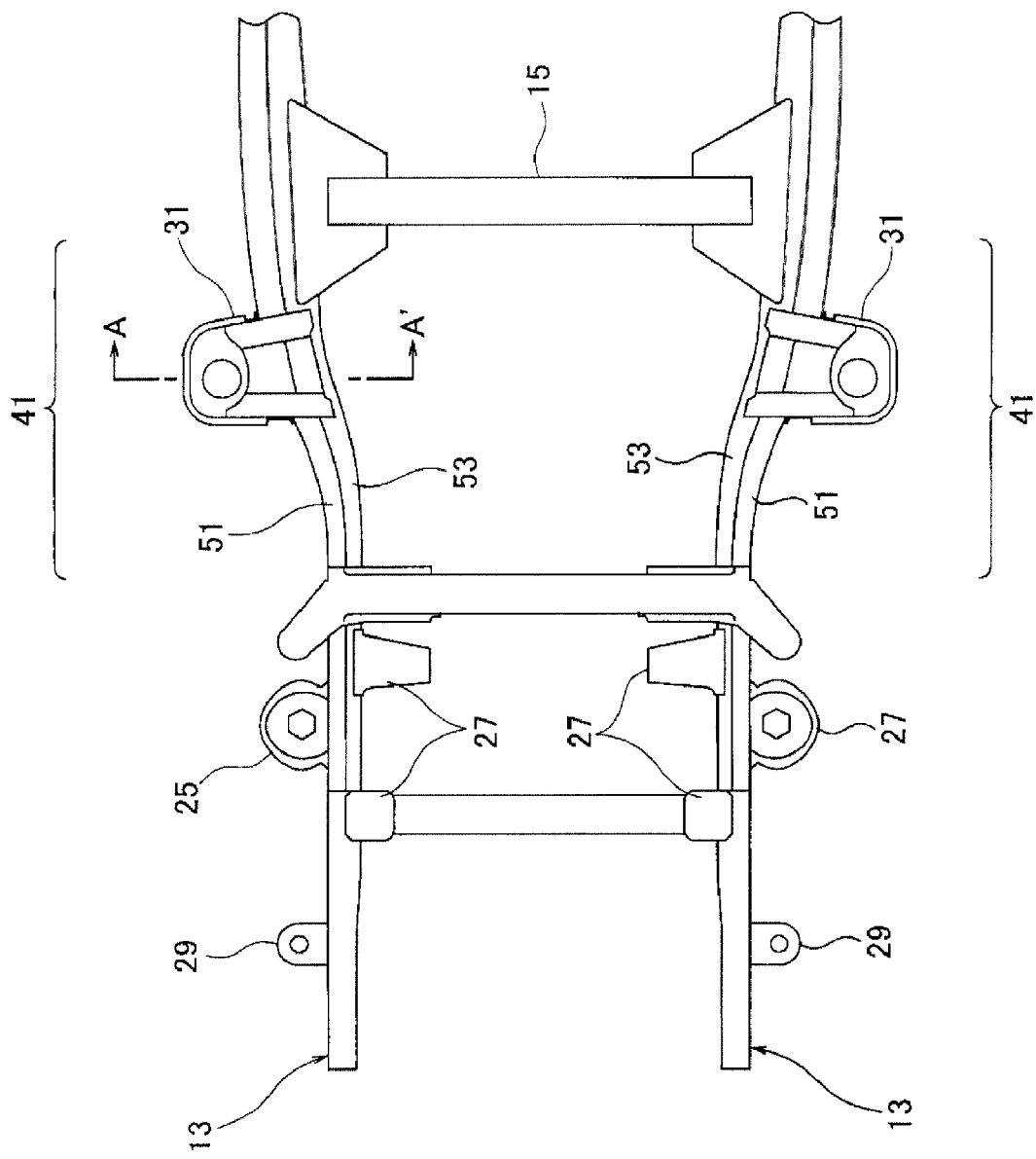
FIG. 4 is a bottom view of a front portion of the frame structure of an automotive vehicle according to the first embodiment of the present invention.
Figure 5:
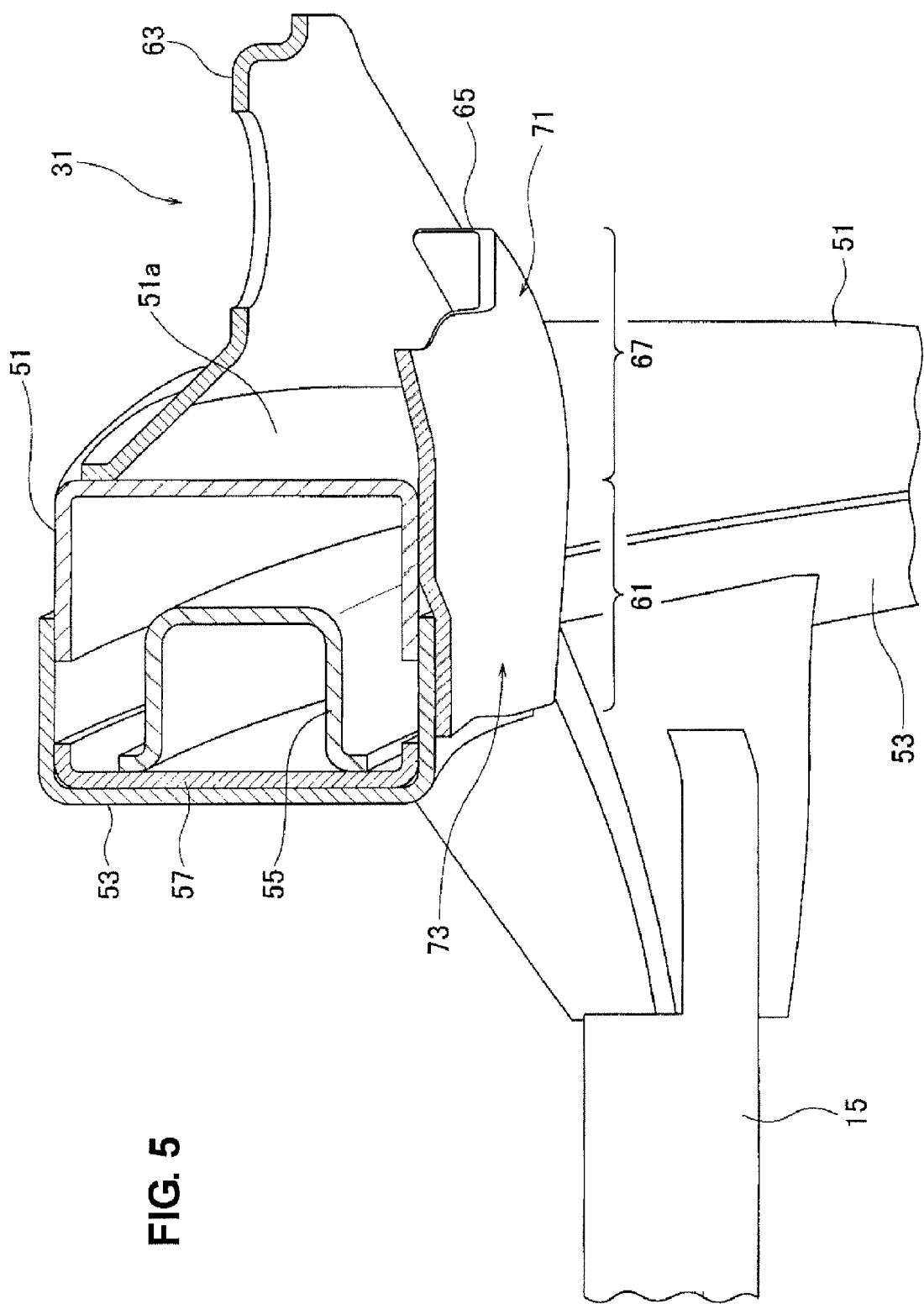
FIG. 5 is a perspective sectional view taken along line A-A' of FIG. 4, when viewed from below.
Figure 6:
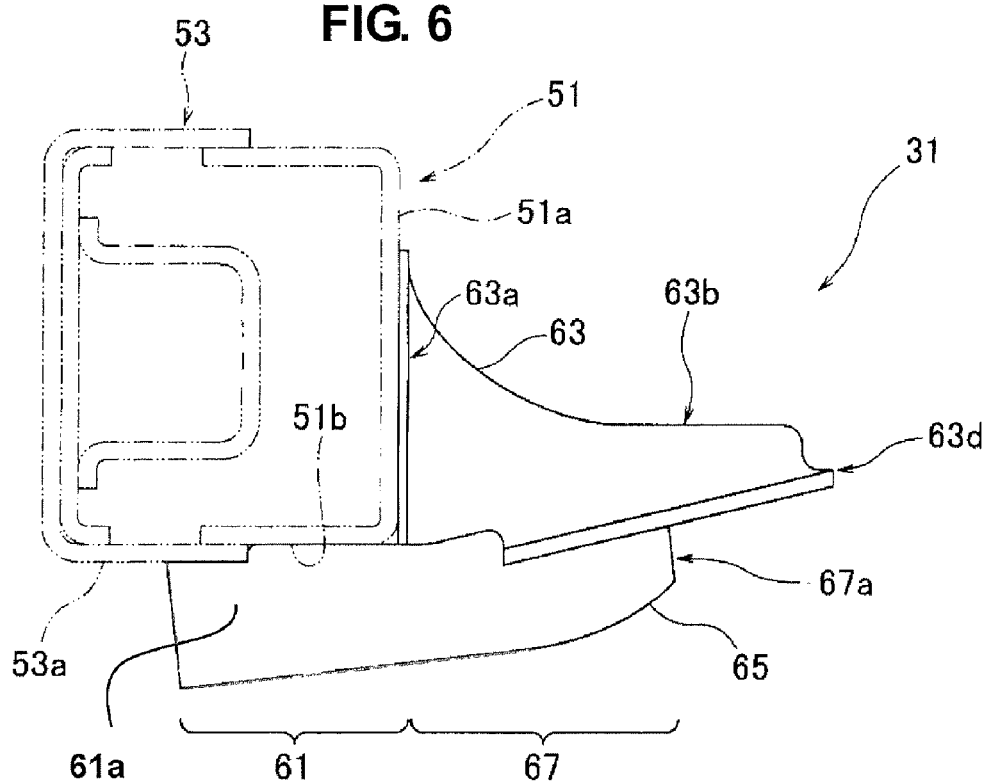
FIG. 6 is an elevation view of a cab-mount bracket according to the first embodiment of the present invention, when viewed from a vehicle front.
Figure 7:
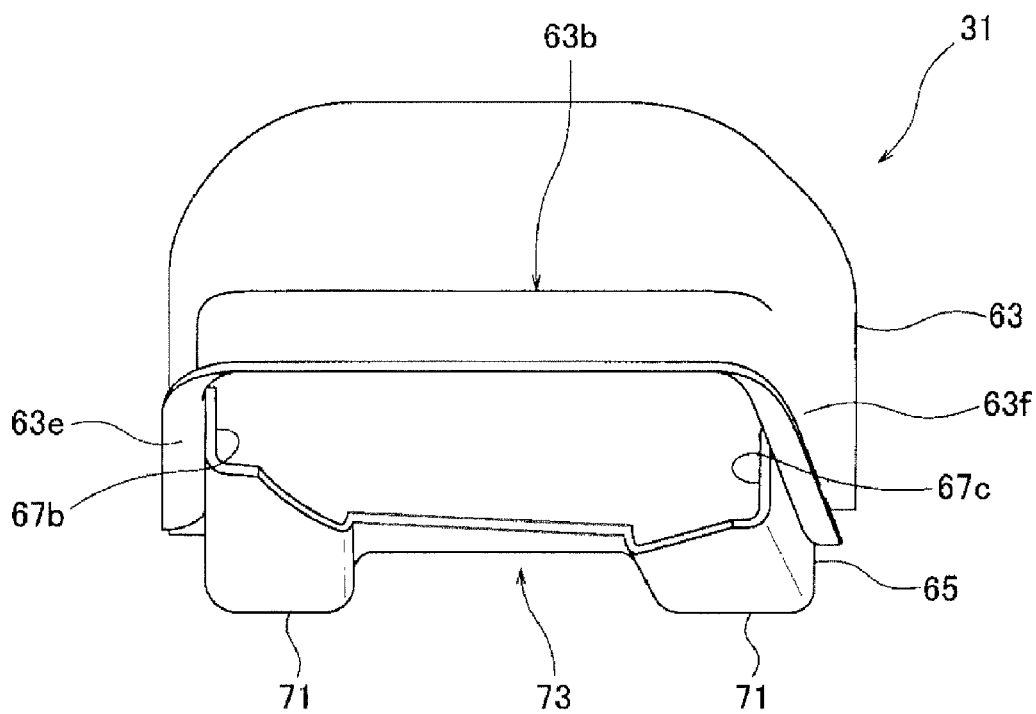
FIG. 7 is a side view of the cab-mount bracket according to the first embodiment of the present invention, when viewed from a vehicle side.
Figure 8:
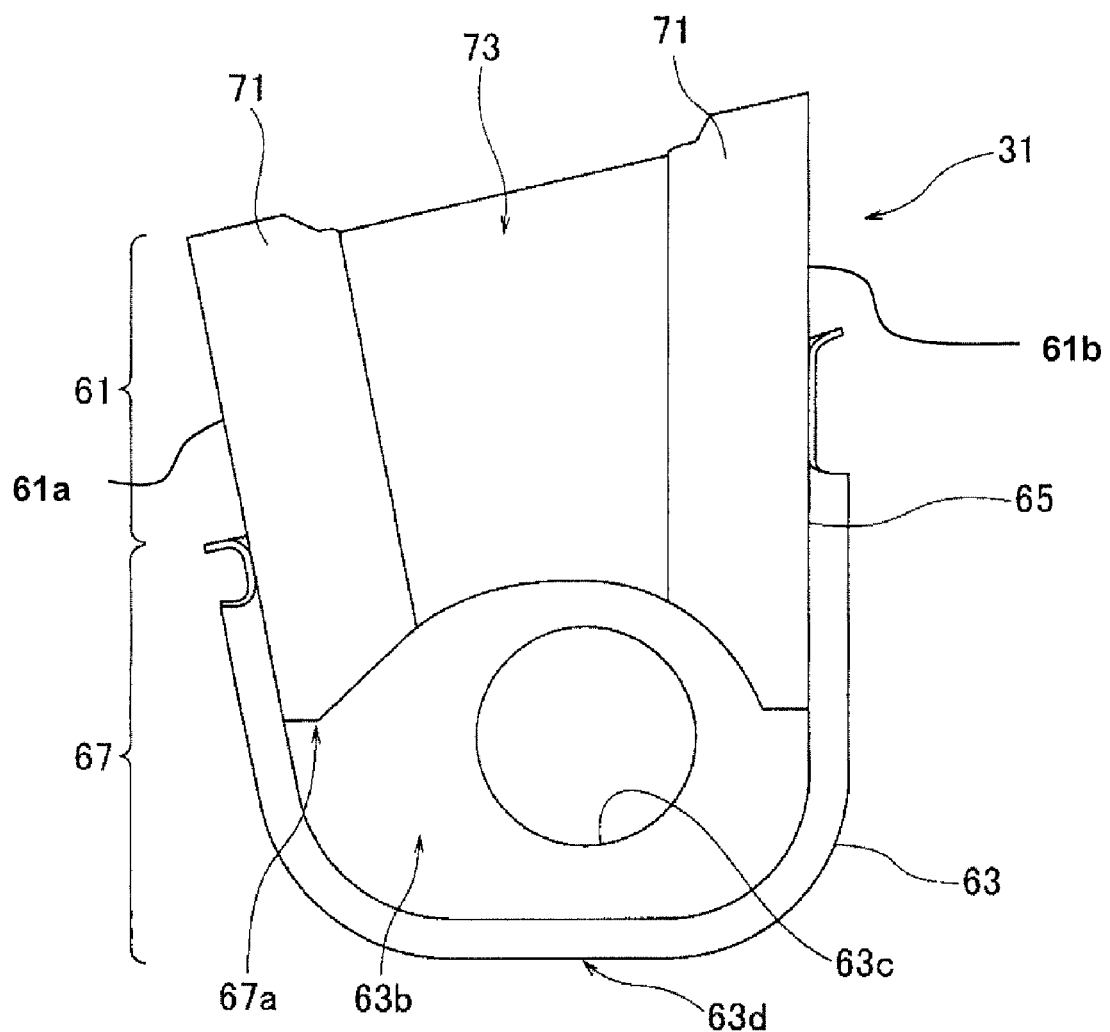
FIG. 8 is a bottom view of the cab-mount bracket according to the first embodiment of the present invention.

FIG. 4 is a bottom view of the front portion of the frame structure of an automotive vehicle according to the present embodiment of the present invention. FIG. 5 is a perspective sectional view taken along line A-A' of FIG. 4, when viewed from below. FIG. 6 is an elevation view of the cab-mount bracket 31, when viewed from a vehicle front. FIG. 7 is a side view of the cab-mount bracket 31. FIG. 8 is a bottom view of the cab-mount bracket 31. As shown in FIGS. 4 and 5, the cab-mount bracket 31 is attached to the front portion of the side frame 13 which extends in the vehicle longitudinal direction, and the cross member 15 is provided in back of the cab-mount bracket 31.

As shown in FIGS. 6 through 8, the cab-mount bracket 31 is provided such that its upper portion is fixed to an outer side face of a side portion 51a of the outer panel 51 on a vehicle outward side and it extends in a vehicle outward direction. Further, the cab-mount bracket 31 includes an extension portion 61 which extends in a vehicle inward direction at its lower portion. The extension portion 61 is fixed to a lower face of the bottom portion 53a of the inner panel 53. The cab-mount bracket 31 interconnects the outer side face of the side portion 51a of the outer panel 51 and the lower face of the bottom portion 53a of the inner panel 53 so as to support the inner panel 53 from below. This cab-mount bracket 31 is formed by an upper-side member 63 and a lower-side member 65 which are joined together. Thus, since the cab-mount bracket 31 is comprised of plural members, setting of the cab-mount bracket 31 at the bend portion 41 can be facilitated.

The upper-side member 63 has a substantially U-shaped cross section with its lower side opening. Likewise, a vehicle-inward end portion 63a of the lower-side member 63 has a substantially U-shaped cross section and is fixed to the outer side face of the side portion 51a of the outer panel 51. The upper-side member 63 extends in the vehicle outward direction from the outer side face of the side portion 51a of the outer panel 51. The upper-side member 63 has a horizontal face 63b at its central portion in the vehicle width direction. The horizontal face 63b has a hole 63c into which a bush (not illustrated) to support the cabin 7 is inserted.

The lower-side member 65 comprises the above-described extension portion 61 and a vehicle-outward end portion 67. The vehicle-outward end portion 67 is located outward from the extension portion 61 so as to be joined to the upper-side member 61. The extension portion 61 extends from the outer side face of the side portion 51a of the outer panel 51 to the lower face of the bottom portion 53a of the inner panel 53, and its both-side wall portions 61a, 61b are joined to the lower face of a bottom portion 51b of the outer panel 51 and the lower face of the bottom portion 53a of the inner panel 53 at respective upper sides. Further, the extension portion 61 includes a pair of projection portions 71 which is provided at a vehicle-forward end portion and a vehicle-rearward end portion of the extension portion 61. The projection portions 71, 71 project downward and extend to the outward end portion of the extension portion 61, respectively. The projection portions 71, 71 increase the bending strength of the extension portion 61 in the vehicle width direction. Between the pair of projection portions 71, 71 is formed a recess 73 which extends in the vehicle width direction. The distance between a bottom portion of the recess 73 and the surface of the projection portions 71 becomes longer toward the vehicle inward portion. The vehicle-outward end portion 67 has a substantially U-shaped cross section with its upper side opening, and extends from the side portion 51a of the outer panel 51 in the vehicle outward direction. Its end portion 67a is located inward from the vehicle-outward end portion 63d of the upper-side member 63. Front and rear wall portions 67b, 67c of the vehicle-outward end portion 67 are joined to front and rear inner walls 63e, 63f of the upper-side member 63, so that the upper-side member 63 and the vehicle-outward end portion 67 form a closed cross section. An end portion 67a of the vehicle-outward end portion 67 has a substantially U-shaped inward curve contour. By forming the substantially U-shaped inward curve contour of the end portion 67a and configuring that the distance between the bottom portion of the recess 73 and the surface of the projection portions 71 becomes shorter toward the vehicle outward portion, setting of the bush can be facilitated and the force transmitted to the end portion 67a from the upper-side member 63 can be dispersed.

As shown in FIGS. 7 and 8, the upper-side member 63 of the cab-mount bracket 31 is joined to the outer side face of the side portion 51a of the outer panel 51, and the lower-side member 65 is joined to the lower face of the bottom portion 51b of the outer panel 51 and the lower face of the bottom portion 53a of the inner panel 53. Further, FIGS. 7 and 8 show that the cab-mount bracket 31 is joined to the lower face of the bend portion 41 and the cross member 15 is provided so as to extend in the vehicle inward direction at the vehicle-rearward portion. The joining position of the cab-mount bracket 31 is decided considering positions of the bend portion 41 and the vehicle compartment 5 of the cabin 7. That is, the bend portion 41 is provided to ensure the proper height of the vehicle compartment 5 as described above, so the front portion of the vehicle compartment 5 is located near the bend portion 41. The cab-mount bracket 31 may be provided at the bend portion 41 as shown in FIG. 7 or at a specified portion before or behind the bend portion 41 according to the position of the front portion of the vehicle compartment 5.

Figure 9A:
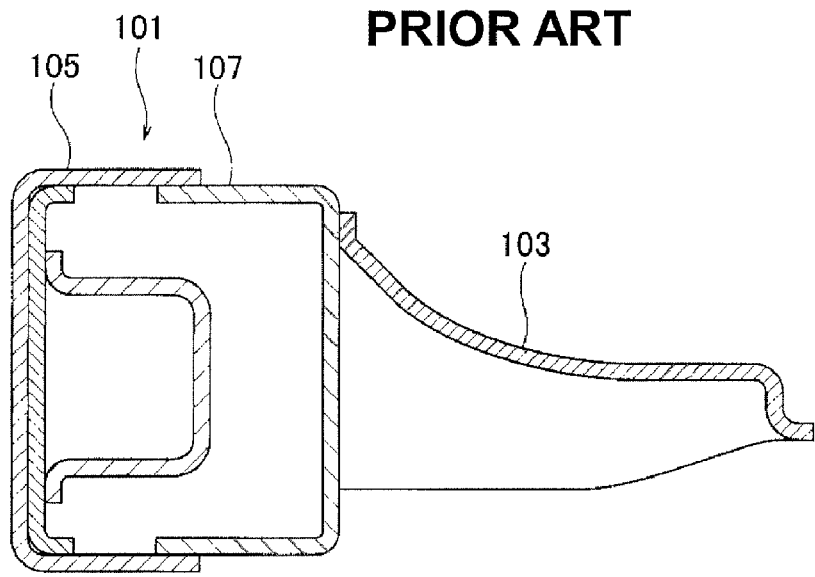
FIGS. 9A, 9B are sectional views showing a side frame and a cab-mount bracket attached to a bend portion of the side frame according to a conventional frame structure of an automotive vehicle.
Figure 9B:
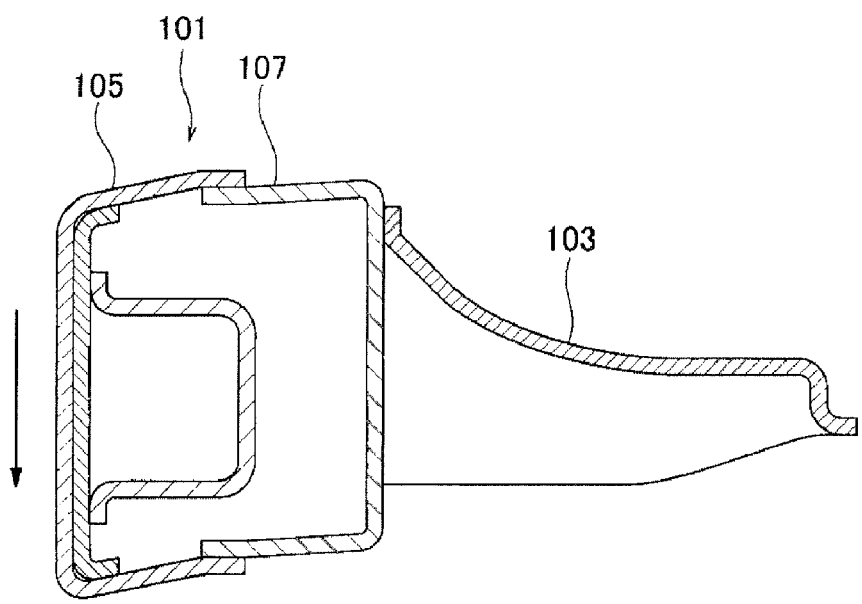
Figure 10:
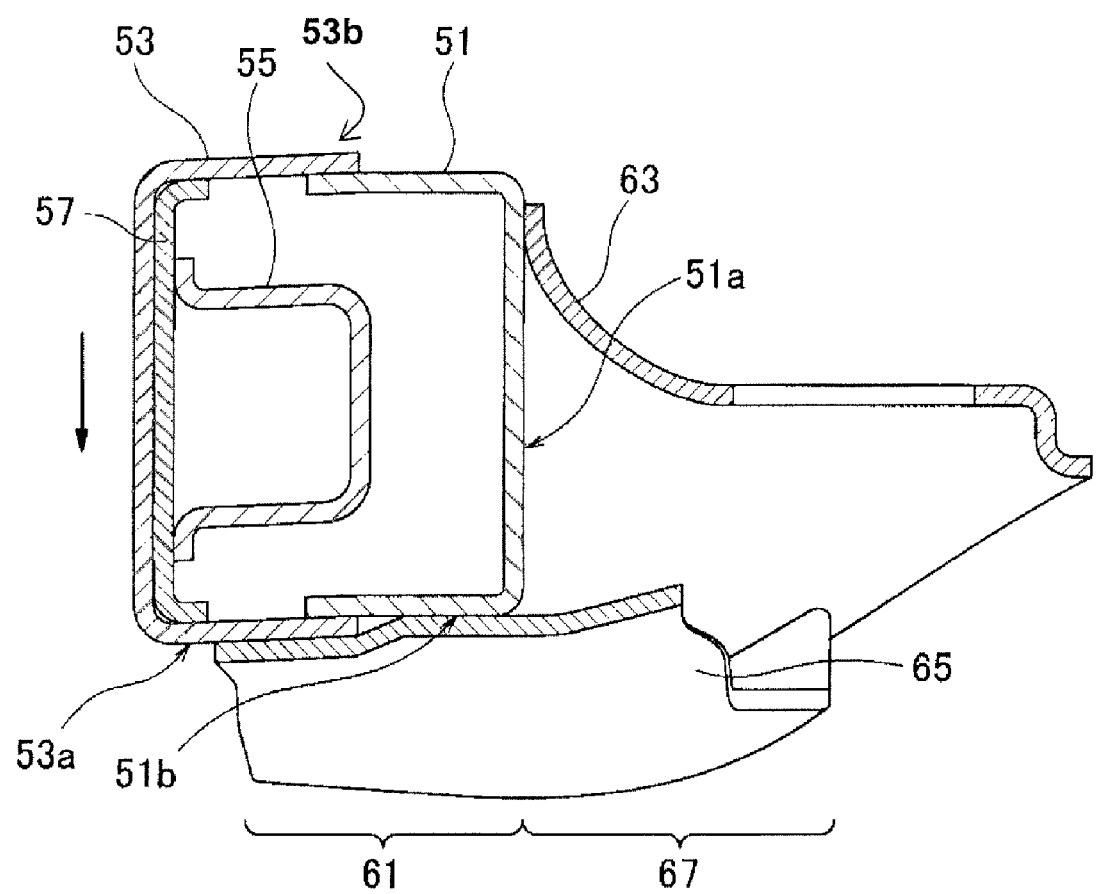
FIG. 10 is a sectional view of the frame structure of an automotive vehicle in the elevation view according to the first embodiment of the present invention.

Next, the operation of the frame structure of an automotive vehicle according to the present embodiment will be described referring to FIGS. 9A, 9B and 10. FIGS. 9A, 9B are sectional views showing a side frame 101 and a cab-mount bracket 103 which is attached to a bend portion of the side frame 101 according to a conventional frame structure of an automotive vehicle. FIG. 10 is a sectional view in the vehicle width direction of the frame structure of an automotive vehicle in the elevation view according to the present embodiment.

FIG. 9A shows a normal state of the side frame 101 of the conventional frame structure. When the vehicle equipped with this frame structure has the front collision, a compressive force acts on the side frame 101 in the vehicle longitudinal direction. When the side frame 101 is compressed, the shear force occurs at the closed cross section which is formed by the inner panel 105 and the outer panel 107 which are joined together. Herein, the shear force concentrates at around a joining portion of these panels 105, 107. Consequently, as shown in FIG. 9B, the closed cross section formed by the inner and outer panels 105, 107 may deform in such a manner that the inner panel 105 is twisted downward.

According to the frame structure of the present embodiment, however, since the specified vehicle-inward portion of the lower face of the bottom portion 53a of the inner panel 53 which is located inward from the joining portion to the outer panel 51 is supported by the lower-side member 65, the above-described deformation of the closed cross section can be restrained as shown in FIG. 10. Moreover, since the lower-side member 65 is fixed to the outer side face of the side portion 51a of the outer panel 51 via the lower face of the bottom portion 51b of the outer panel 51 and upper-side member 63, the lower-side member 65 can be restrained from being disconnected even if it is pushed downward by the inner panel 53. Further, since the projection portions 71 are provided at the extension portion 61 of the lower-side member 65, the shear deformation of the lower-side member 65 in the vehicle width direction can be restrained even when the lower-side member 65 is pushed downward by the lower face of the bottom portion 53a of the inner panel 53.

Herein, while the cab-mount bracket 31 is provided at around the bend portion 41 in the present embodiment, the deformation of the side frame 13 can be further prevented by setting the joining position of the cab-mount bracket 31 as follows.

Figure 11:
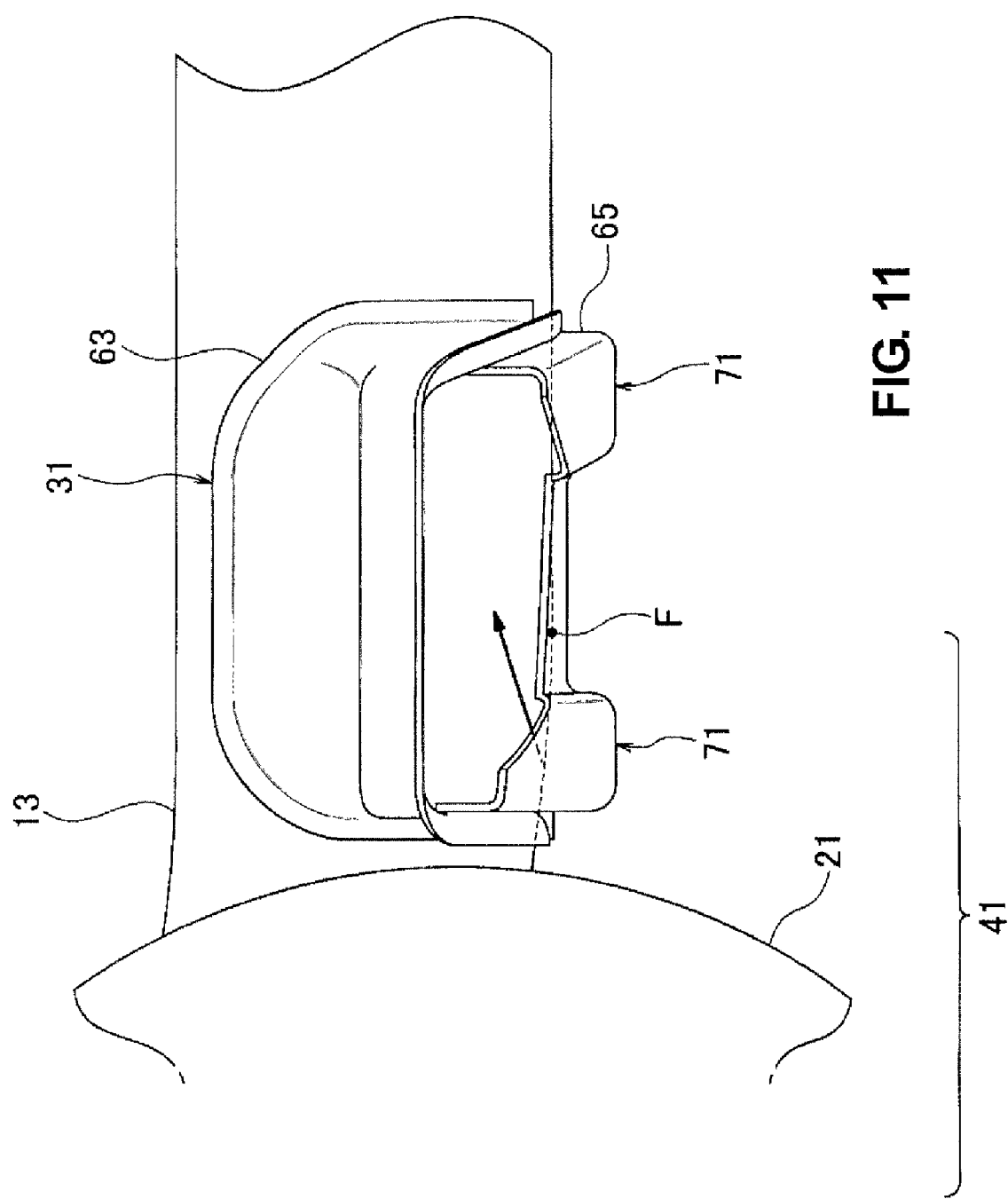
FIG. 11 is a side view of a bend portion and its surrounding portion of the frame structure of an automotive according to the first embodiment of the present invention, when viewed from the vehicle side.

FIG. 11 is a side view of the bend portion 41 and its surrounding portion of the frame structure of an automotive according to the present embodiment, when viewed from the vehicle side. As shown in this figure, it may be preferable that the vehicle-forward end portion of the cab-mount bracket 31 be connected to a specified portion of the side frame 13 in front of a bend portion F of the side frame 13. Herein, the bend portion F is a portion where the lower face of the side frame 13 which is inclined rearward and downward becomes flat.

According to this frame structure, as the front wheel 21 is pushed rearward at the vehicle frontal collision, it contacts the cab-mount bracket 31 and thereby the cab-mount bracket 31 is pushed rearward as well. Thus, the vehicle-forward end portion of the cab-mount bracket 31, which is located before the bend portion F of the side frame 13, pushes the lower face of the bottom portion 53a of the inner panel 53 upward. Accordingly, the shear deformation of the side frame 13 can be further restrained.

Embodiment 2

Figure 12:
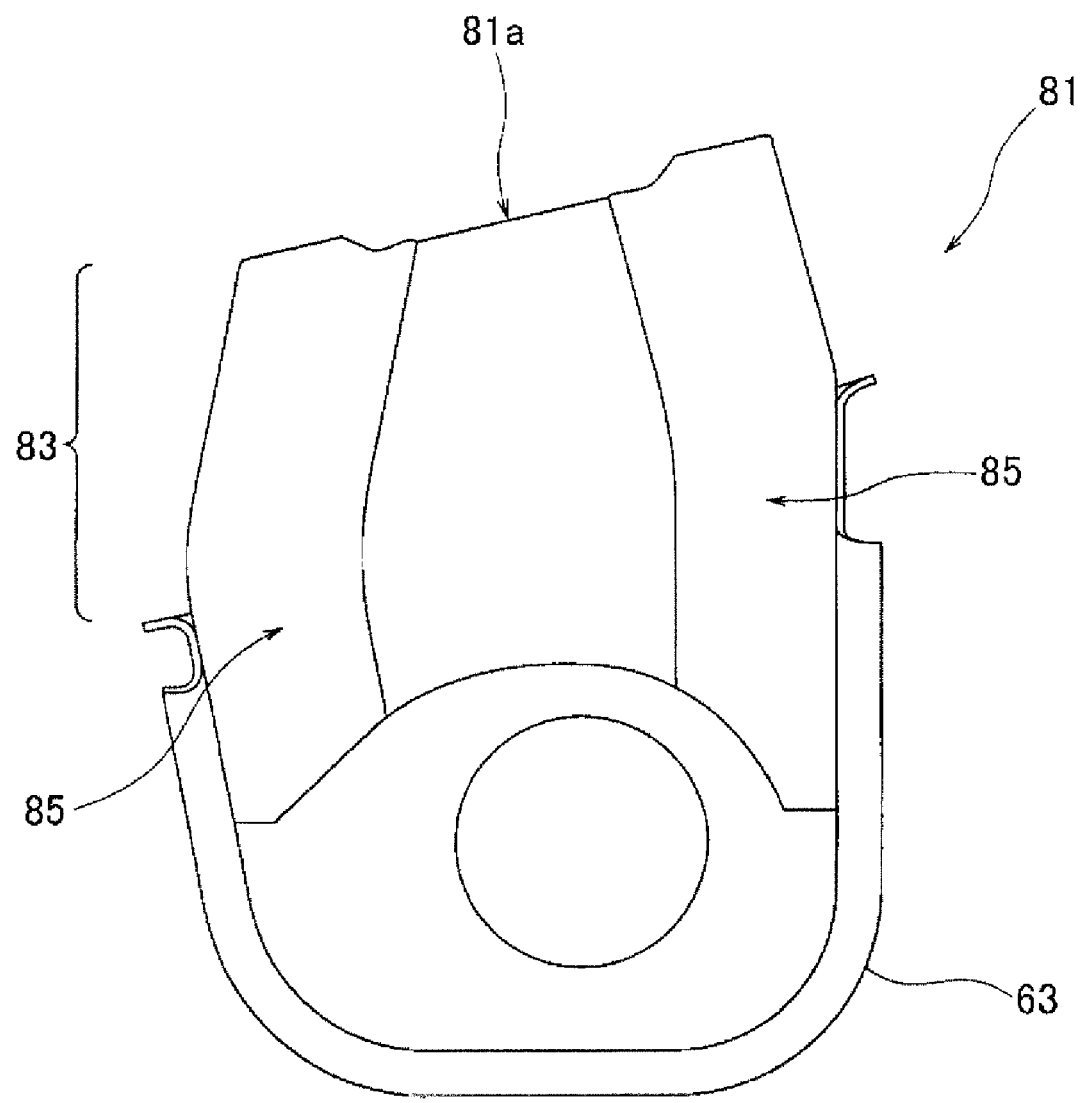
FIG. 12 is a bottom view of a cab-mount bracket according to a second embodiment of the present invention.

Another frame structure of an automotive vehicle according to a second embodiment of the present invention will be described referring to FIGS. 12 through 14. FIG. 12 is a bottom view of a cab-mount bracket 81 according to the second embodiment.

As shown in FIG. 12, the cab-mount bracket 81 is configured such that the width of an extension portion 83 becomes narrower toward the vehicle inward side, and likewise projection portions 85 of the cab-mount bracket 81 extend toward the vehicle inward side, curving toward the central side of the bracket 81. Thus, the longitudinal length of a vehicle-inward end portion 81a of the cab-mount bracket 81 becomes shorter than that of a central portion of the cab-mount bracket 81.

Figure 13:
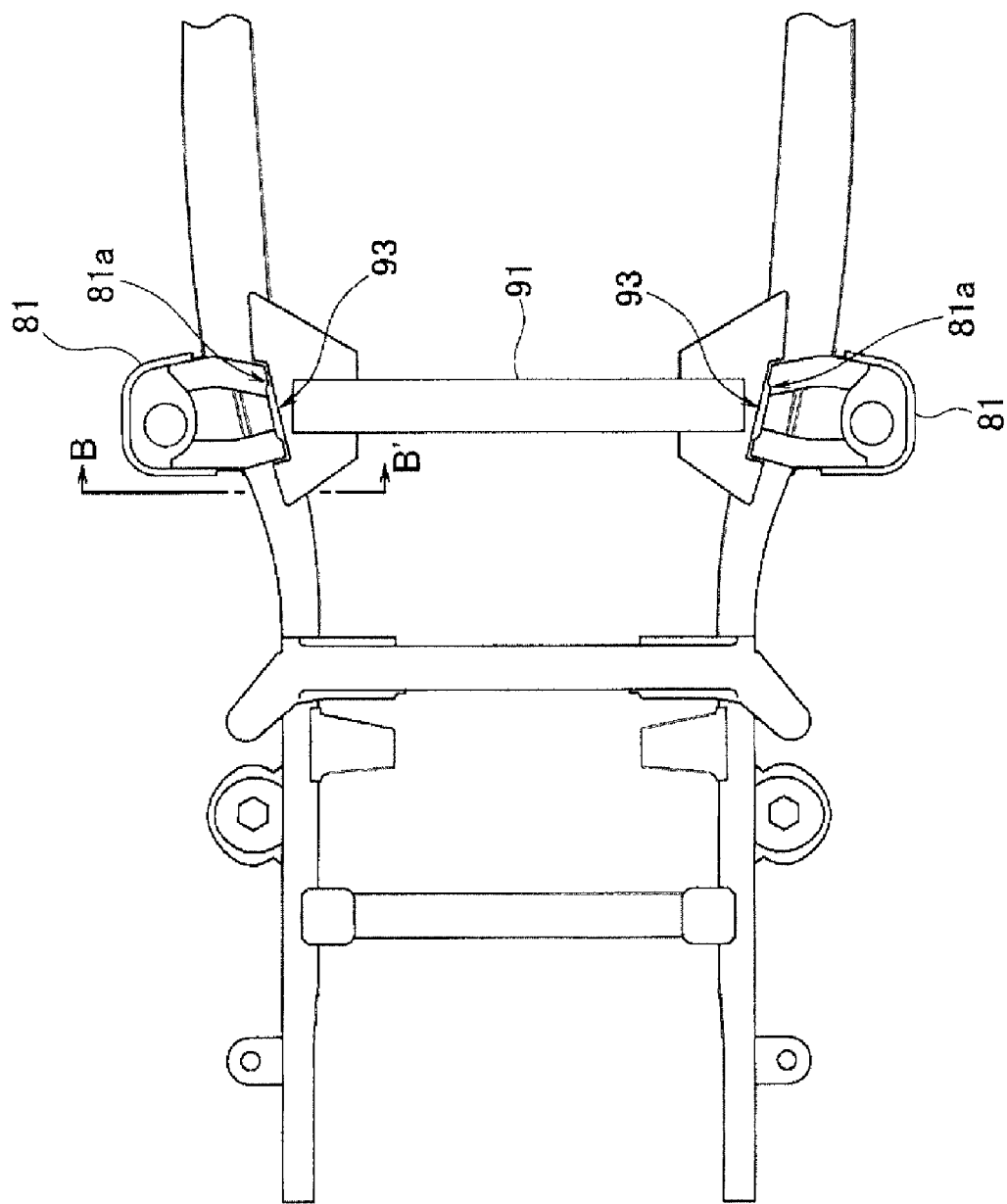
FIG. 13 is a bottom view of a front portion of a frame structure of an automotive vehicle according to the second embodiment of the present invention.
Figure 14:
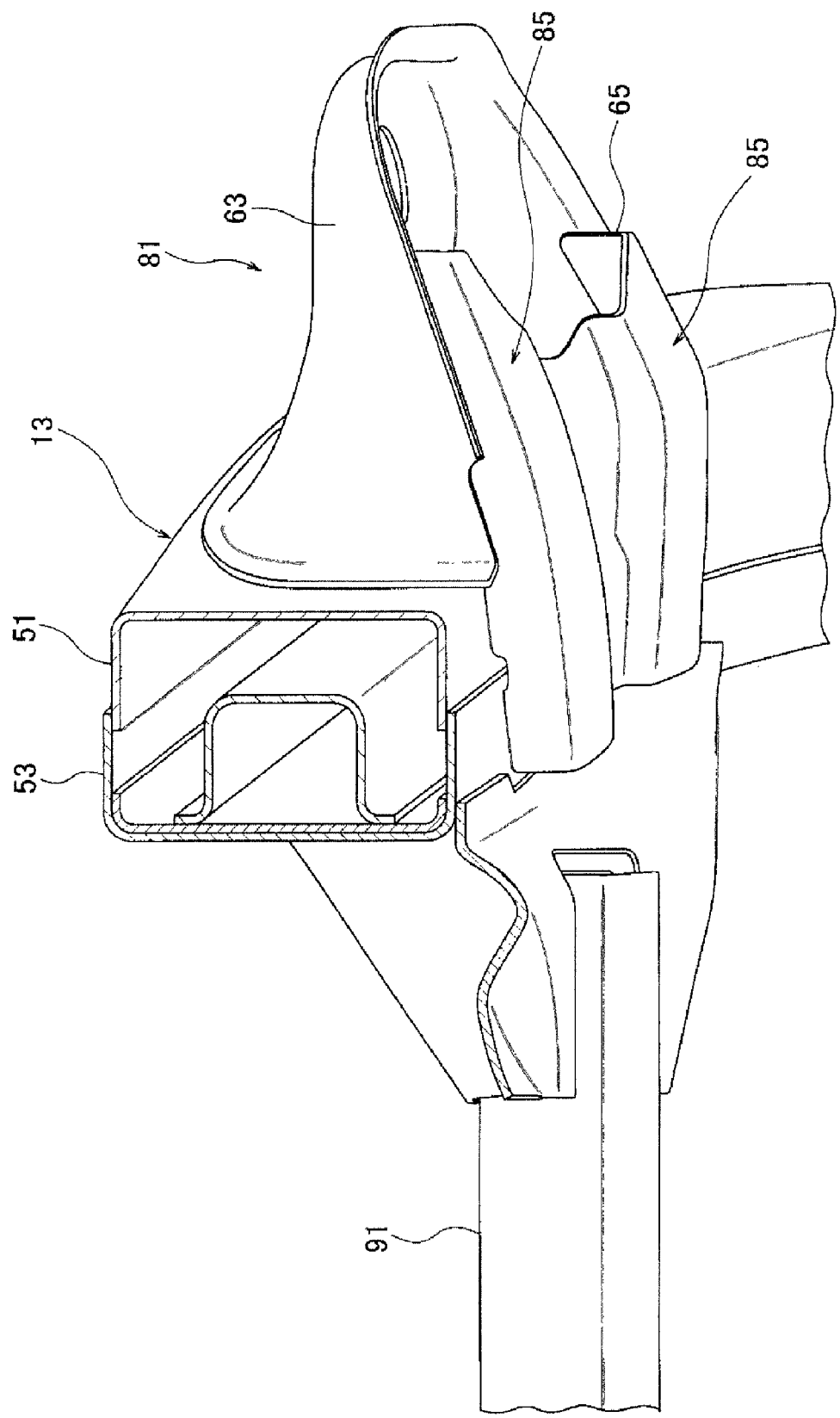
FIG. 14 is a perspective sectional view taken along line B-B' of FIG. 13, when viewed from below.

FIG. 13 is a bottom view of a front portion of the frame structure of an automotive vehicle according to the present embodiment. FIG. 14 is a perspective sectional view taken along line B-B' of FIG. 13, when viewed from below. As shown in FIGS. 13 and 14, the above-described cab-mount bracket 81 is provided at the lower face of the specified portion of the side frame 13 which is located near the bend portion 41. A cross member 91 is provided between the both-side side frames 13 so as to interconnect them.

The cross member 91 which is joined to the lower face of the inner panel 13 has notch portions 93 at both ends in such a manner its end portion is joined to the lower face of the inner panel 13 astride an vehicle-inward end portion 81a of the cab-mount bracket 81. Thus, a vehicle-inward end portion 81a of the cab-mount bracket 81 is disposed at the notch portion 93, so that the cab-mount bracket 81 does not overlap with the cross member 91.

Thus, the longitudinal length of the vehicle-inward end portion 81a of the cab-mount bracket 81 is made properly short, and the notch portions 93 are provided at the ends of the cross member 91. Thereby, the cross member 91 can be disposed easily at around the bend portion 41 where the cab-mount bracket 81 is provided, and the strength of the bend portion 41 can be properly increased.

The present invention should not be limited to the above-described embodiments, and any other modifications and improvements may be applied within the scope of a spirit of the present invention.

What is claimed is:

1. A frame structure of an automotive vehicle, comprising:
a pair of side frames extending in a vehicle longitudinal direction and provided being away from each other in a vehicle width direction, each of said side frames including a closed cross section which is formed by an outer panel and an inner panel which are joined together, the outer panel having a U-shaped cross section with a vehicle's inward side thereof opening and the inner panel having a U-shaped cross section with a vehicle's outward side thereof opening; and
a cab-mount bracket provided on a vehicle outward side of a front portion of each of said side frames, the cab-mount bracket supporting a cabin,
wherein said cab-mount bracket includes an upper portion which is joined to an outer side face of said outer panel of each of said side frames and extends in a vehicle outward direction and a lower portion which includes an extension portion thereof which extends in a vehicle inward direction beyond the outer side face of the outer panel of each of said side frames to a location of a lower face of said inner panel of each of said side frames, the extension portion of the lower portion of the cab-mount bracket being joined to the lower face of the inner panel of each of said side frames.

2. The frame structure of an automotive vehicle of claim 1, wherein each of said side frames includes a bend portion which bends laterally or vertically at a specified portion thereof where said cab-mount bracket is provided or adjacent to the specified portion.

3. The frame structure of an automotive vehicle of claim 2, wherein said upper portion of the cab-mount bracket comprises an upper-side member which is joined to said outer side face of the outer panel of each of said side frames and said lower portion of the cab-mount bracket comprises a lower-side member which has the extension portion at a vehicle inward and the extension portion of the lower-side member being joined together, and the extension portion of the lower-side member is joined to the lower faces of said outer and inner panels of each of said side frames respectively.

4. The frame structure of an automotive vehicle of claim 3, wherein said extension portion of the lower-side member of the cab-mount bracket includes a pair of projection portions which is provided at a vehicle-forward end portion and a vehicle-rearward end portion of the extension portion so as to project downward and extend in the vehicle width direction, respectively.

5. The frame structure of an automotive vehicle of claim 4, wherein a vehicle outward end portion of said lower-side member has a substantially U-shaped cross section with an upper side thereof opening and said upper-side member has a substantially U-shaped cross section with a lower side thereof opening, the lower-side member and the upper-side member are overlapped so as to form a crossed cross section therewith, and the upper-side member extends in the vehicle width direction over an area from the vehicle-outward end portion of the lower-side member to the extension portion of the lower side member.

6. The frame structure of an automotive vehicle of claim 5, wherein said vehicle outward end portion of the lower-side member of the cab-mount bracket is located inwardly from a vehicle-outward end portion of said upper-side member, and the vehicle-outward end portion of the lower side member has a substantially U-shaped inward curve contour.

7. The frame structure of an automotive vehicle of claim 6, wherein said cab-mount bracket is configured such that a width of the extension portion in the vehicle longitudinal direction becomes narrower toward a vehicle inward side, and a cross member is provided so as to connect the pair of side frames in the vehicle width direction in such a manner an end portion thereof is joined to said lower face of the inner panel astride a vehicle-inward end portion of said extension portion of the cab-mount bracket.

8. The frame structure of an automotive vehicle of claim 7, wherein said bend portion of each of said side frames bends downward and rearward near a vehicle front wheel, and said cab-mount bracket is provided at the bend portion of each of said side frames.

9. The frame structure of an automotive vehicle of claim 8, wherein a reinforcement member is provided inside said bend portion of each of said side frames so as to extend in a longitudinal direction of each of said side frames and to be joined to an inner side face of the inner panel, without being joined to the outer panel.

10. The frame structure of an automotive vehicle of claim 9, wherein said reinforcement member is joined to the inner side face of the inner panel so as to cover a substantially whole area of the inner side face of the inner panel from a bottom portion to an upper portion of the inner panel.

11. The frame structure of an automotive vehicle of claim 2, wherein said cab-mount bracket is configured such that a width of the extension portion in the vehicle longitudinal direction becomes narrower toward a vehicle inward side, and a cross member is provided so as to connect the pair of side frames in the vehicle width direction in such a manner an end portion thereof is joined to said lower face of the inner panel astride a vehicle-inward end portion of said extension portion of the cab-mount bracket.

12. The frame structure of an automotive vehicle of claim 2, wherein said bend portion of each of said side frames bends downward and rearward near a vehicle front wheel, and said cab-mount bracket is provided at the bend portion of each of said side frames.

13. The frame structure of an automotive vehicle of claim 2, wherein a reinforcement member is provided inside said bend portion of each of said side frames so as to extend in a longitudinal direction of each of said side frames and to be joined to an inner side face of the inner panel, without being joined to the outer panel.

14. The frame structure of an automotive vehicle of claim 13, wherein said reinforcement member is joined to the inner side face of the inner panel so as to cover a substantially whole area of the inner side face of the inner panel from a bottom portion to an upper portion of the inner panel.

15. The frame structure of an automotive vehicle of claim 1, wherein said cab-mount bracket is configured such that a width of the extension portion in the vehicle longitudinal direction becomes narrower toward a vehicle inward side, and a cross member is provided so as to connect the pair of side frames in the vehicle width direction in such a manner an end portion thereof is joined to said lower face of the inner panel astride a vehicle-inward end portion of said extension portion of the cab-mount bracket.

* * * * *